Figure 1:
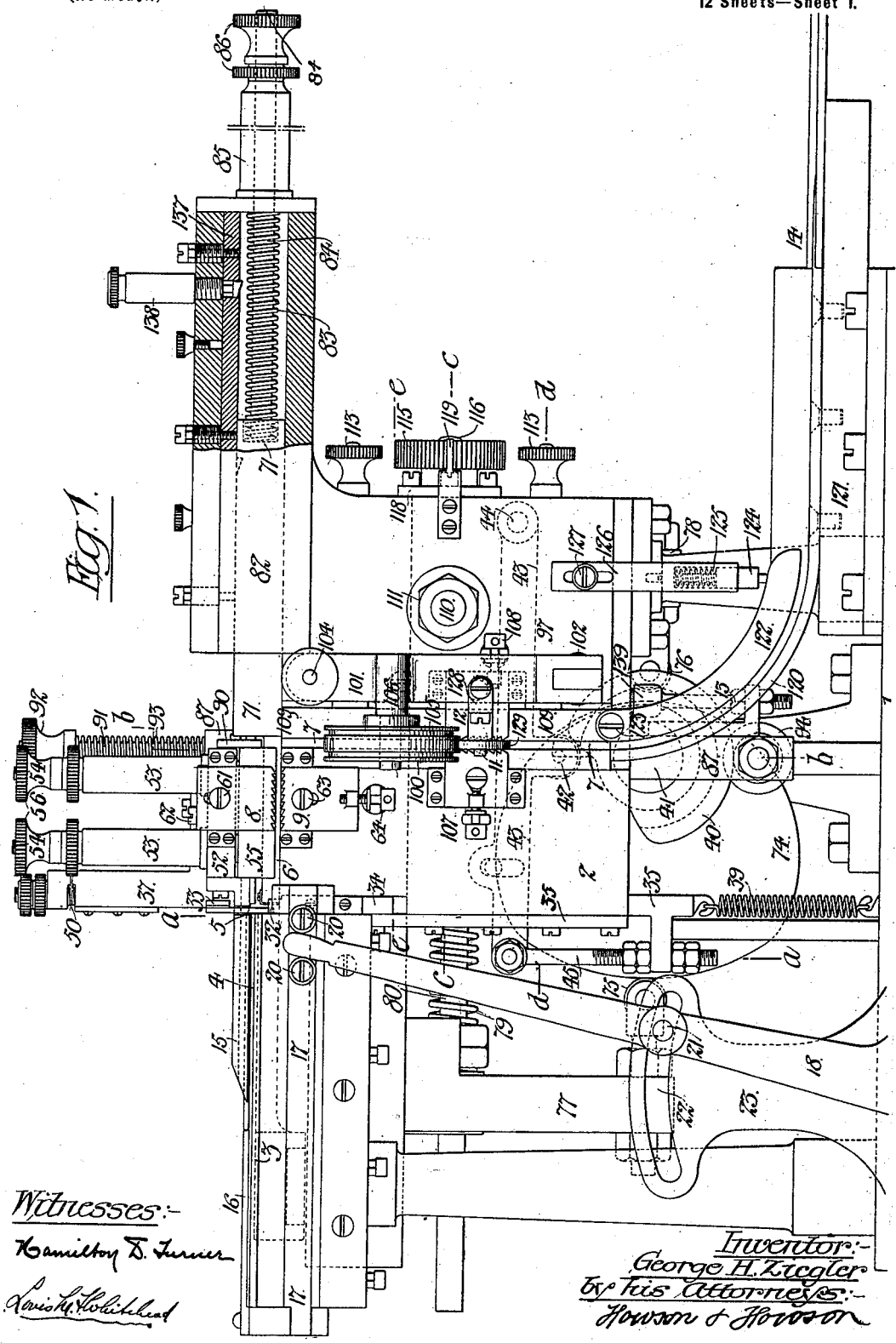

No. 685,083.  
Patented Oct. 22, 1901.

G. H. ZIEGLER.
TYPE FINISHING MACHINE.
(Application filed June 13, 1901.)

(No Model.)  
12 Sheets—Sheet 1.

Witnesses:—

Inventor:—
George H. Ziegler
by his Attorneys:—
Howson & Howson

THE NORRIS PETERS CO., PHOTO-LITHO., WASHINGTON, D. C.

No. 685,083.    Patented Oct. 22, 1901.
G. H. ZIEGLER.
TYPE FINISHING MACHINE.
(Application filed June 13, 1901.)

(No Model.)    12 Sheets—Sheet 2.

Fig. 2.

Witnesses:—

Inventor:
George H. Ziegler
by
his Attorneys

No. 685,083. Patented Oct. 22, 1901.
G. H. ZIEGLER.
TYPE FINISHING MACHINE.
(Application filed June 13, 1901.)
(No Model.) 12 Sheets—Sheet 3.
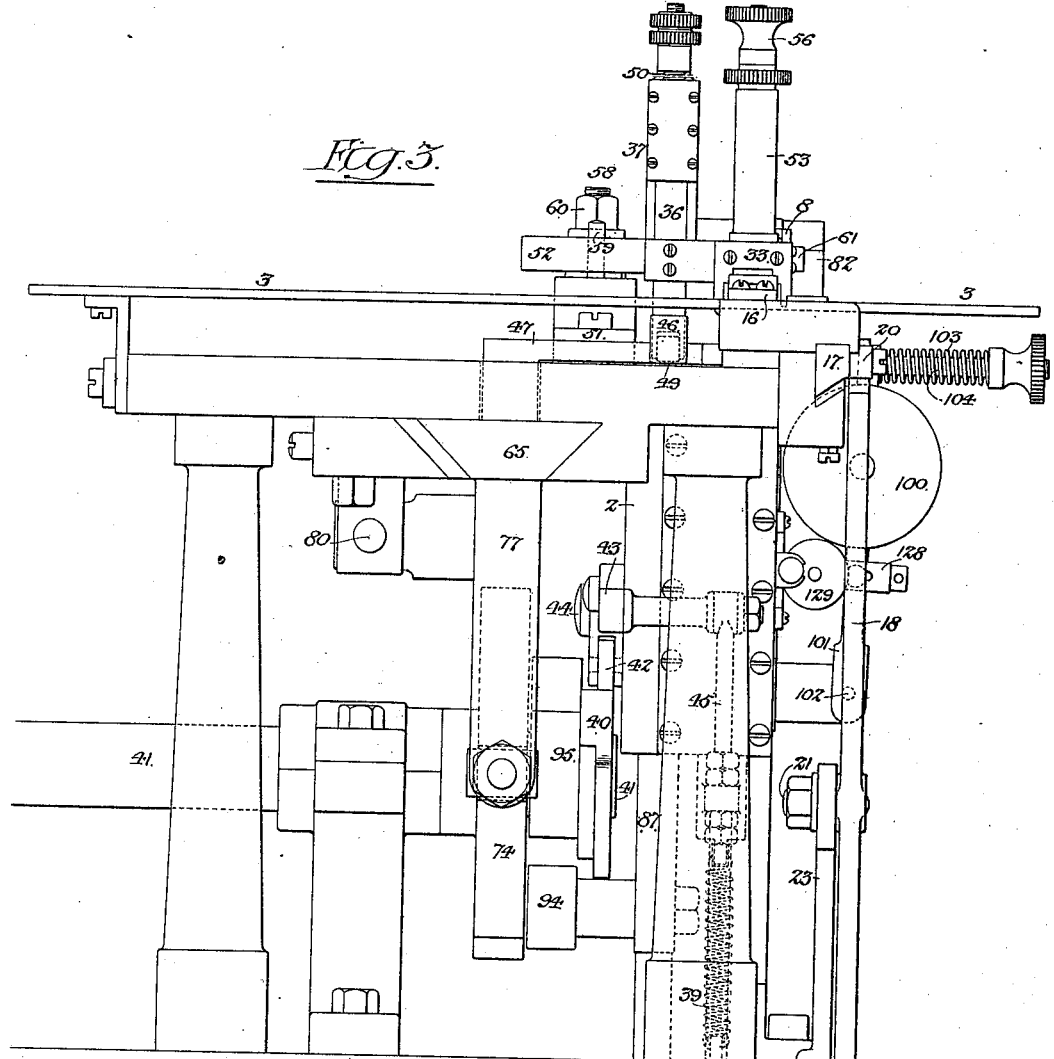
Fig. 3.
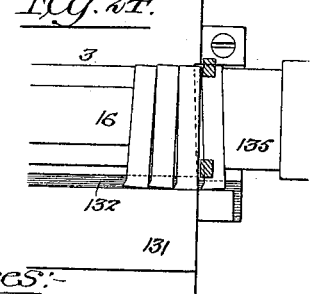
Fig. 24.
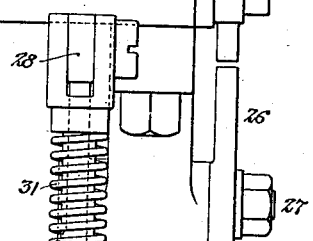
Witnesses:—
Hamilton D. Turner
Louis H. Whitehead
Inventor:—
George H. Ziegler
by his Attorneys:—
Howson & Howson No. 685,083. Patented Oct. 22, 1901.
G. H. ZIEGLER.
TYPE FINISHING MACHINE.
(Application filed June 13, 1901.)
(No Model.) 12 Sheets—Sheet 4.
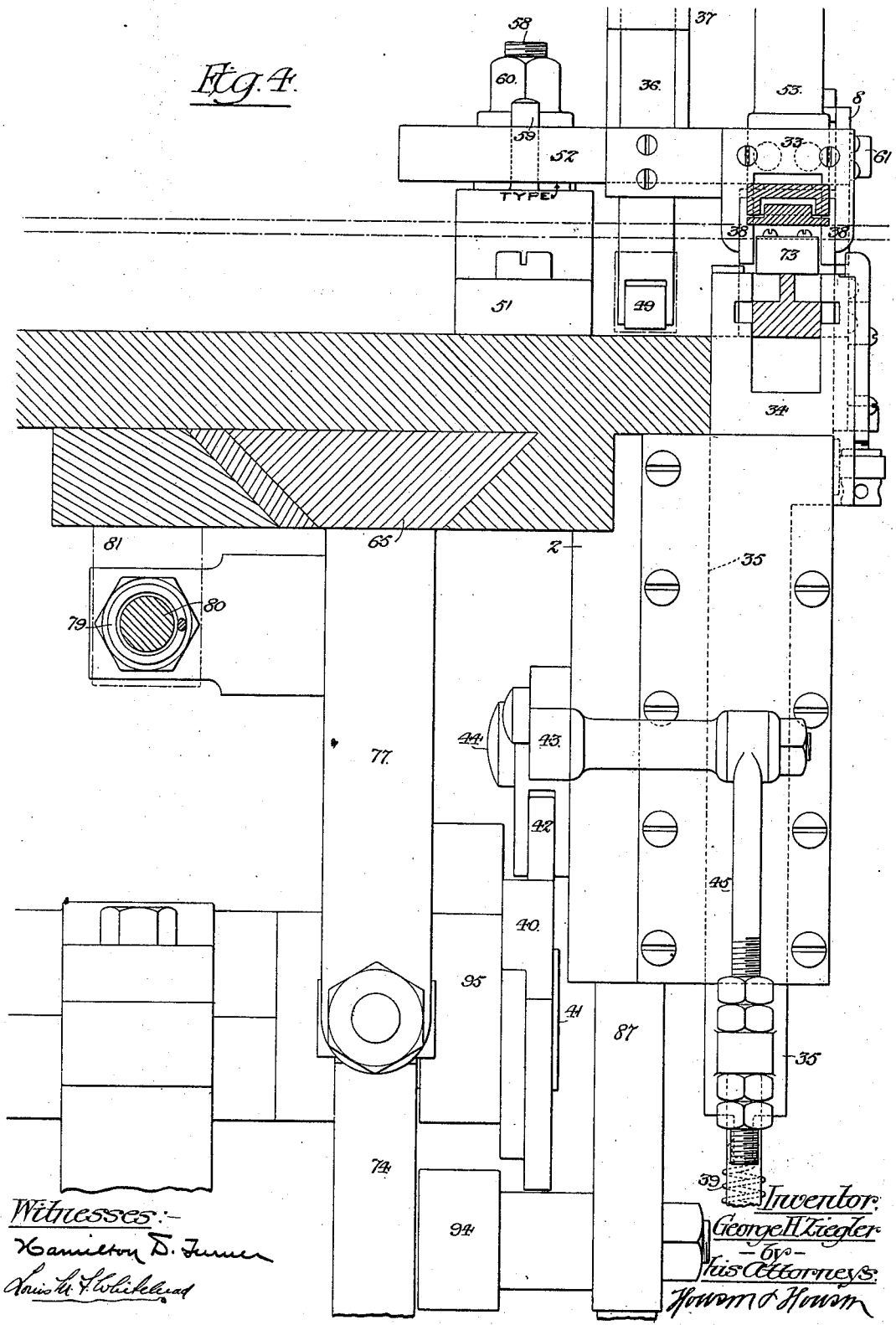

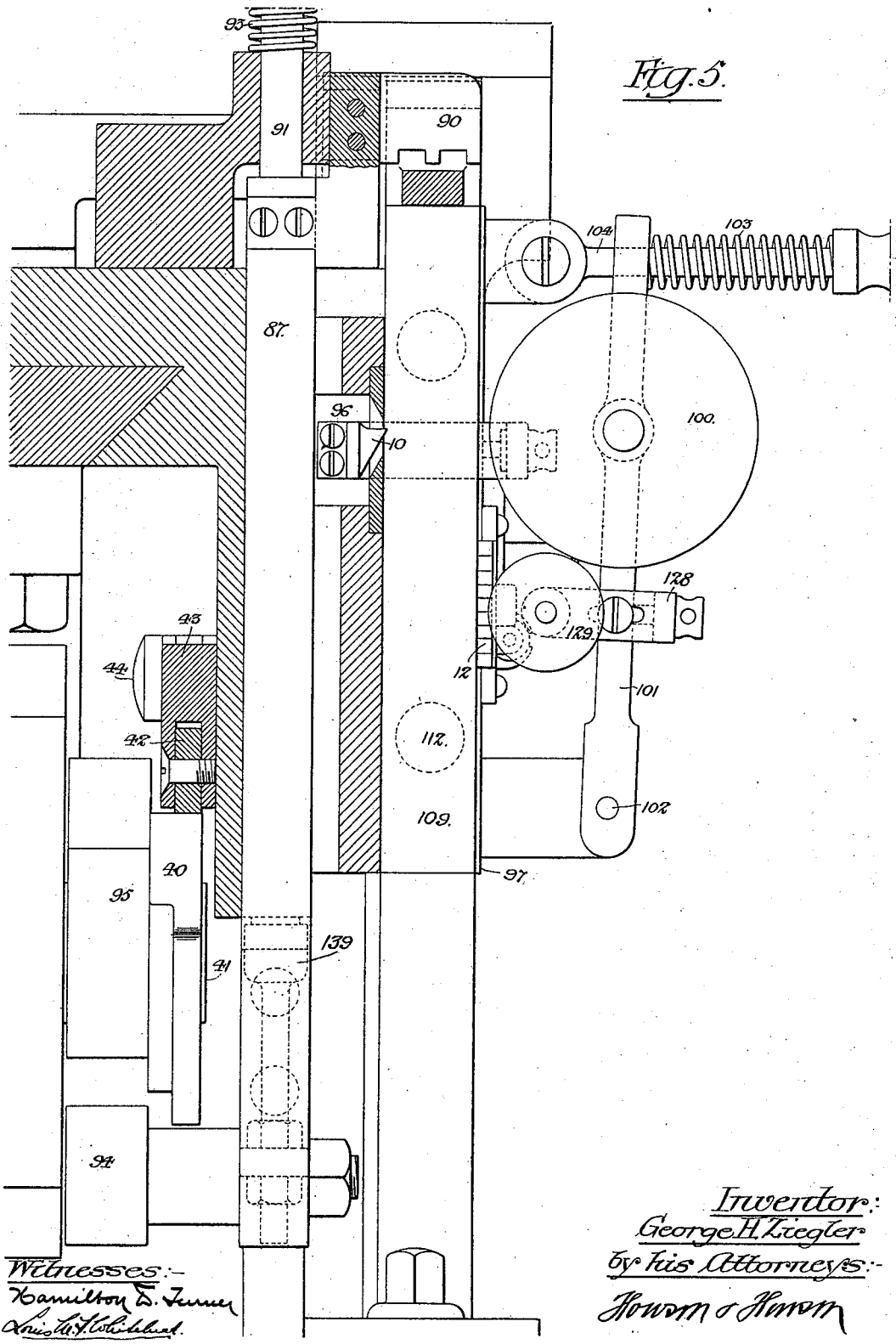

No. 685,083. Patented Oct. 22, 1901.
G. H. ZIEGLER.
TYPE FINISHING MACHINE.
(Application filed June 13, 1901.)
(No Model.) 12 Sheets—Sheet 6.
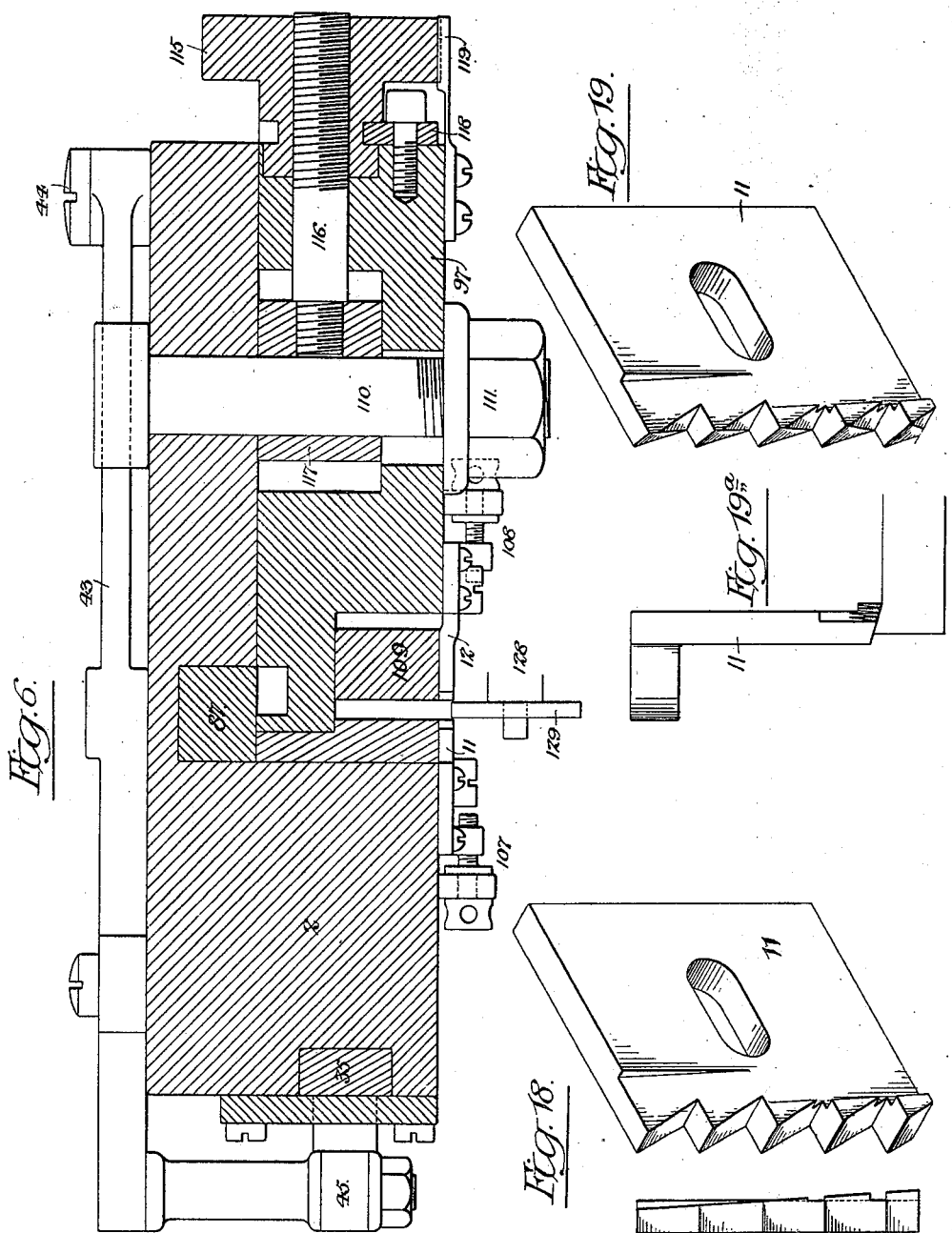

No. 685,083. Patented Oct. 22, 1901.
G. H. ZIEGLER.
TYPE FINISHING MACHINE.
(Application filed June 13, 1901.)
(No Model.) 12 Sheets—Sheet 7.
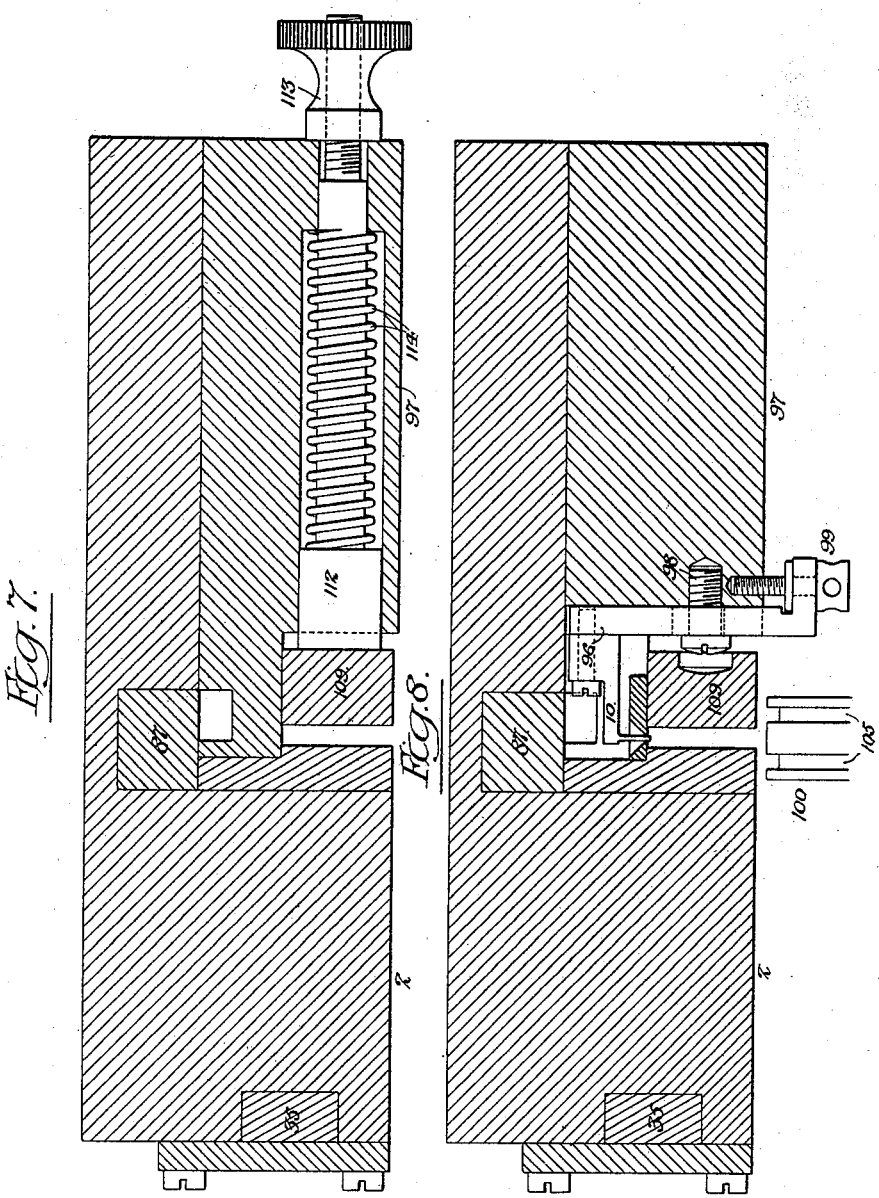

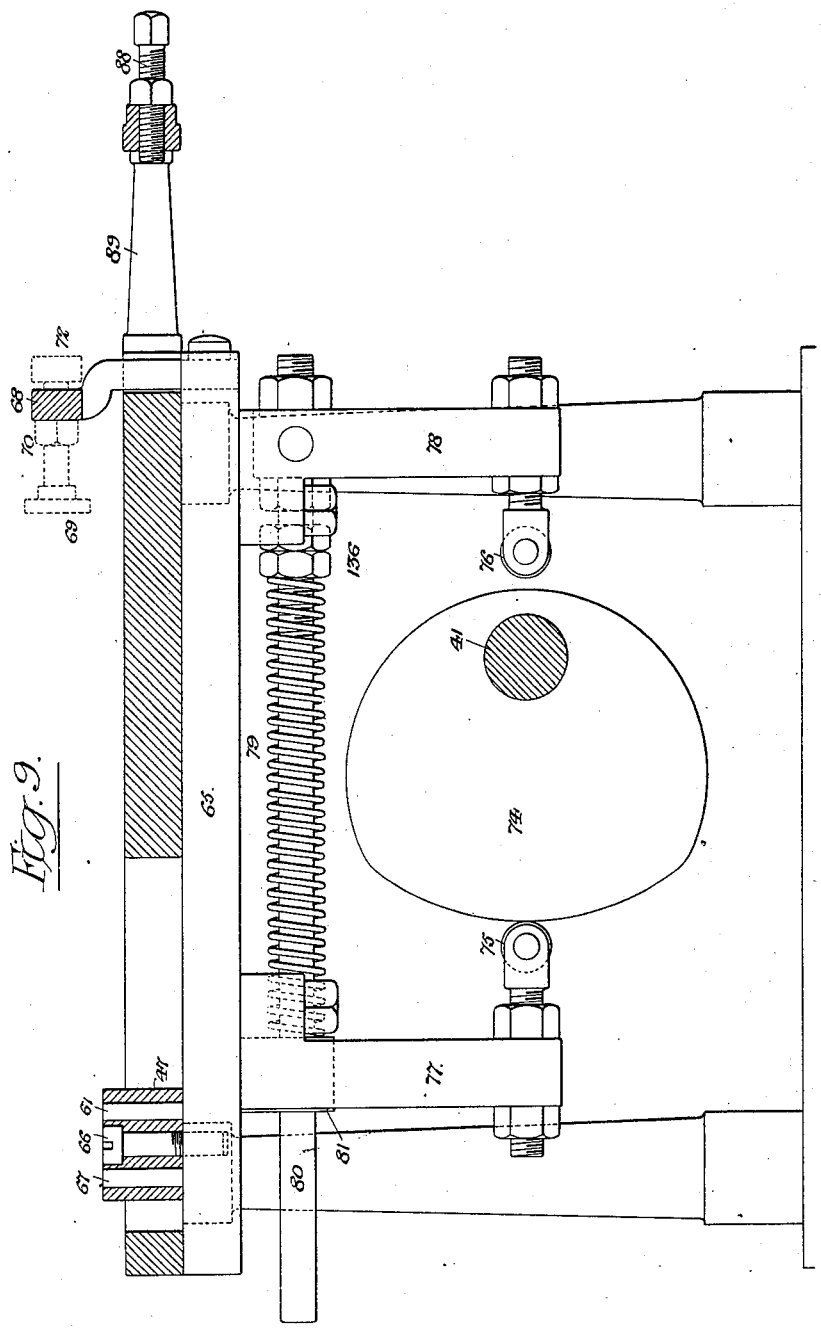

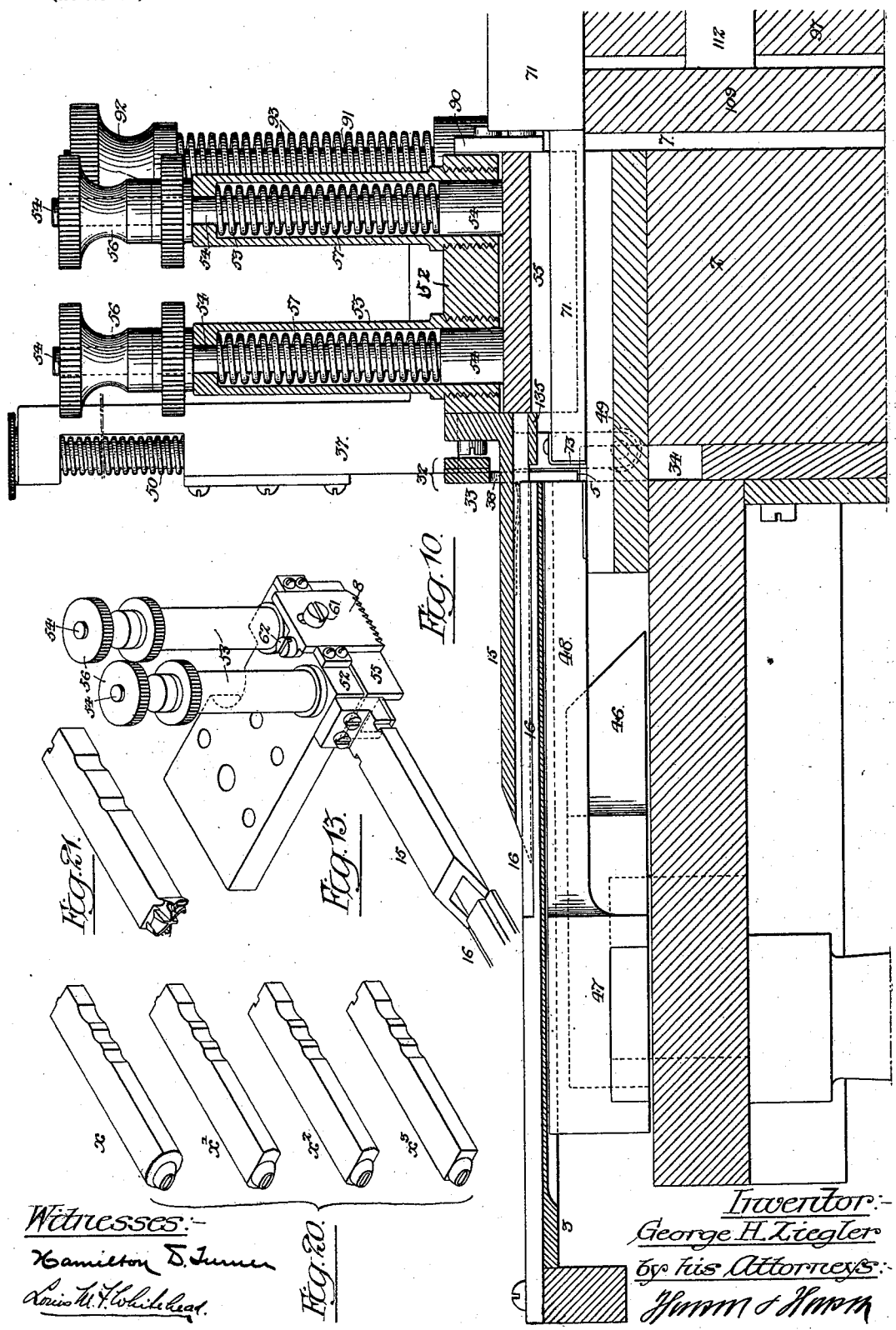

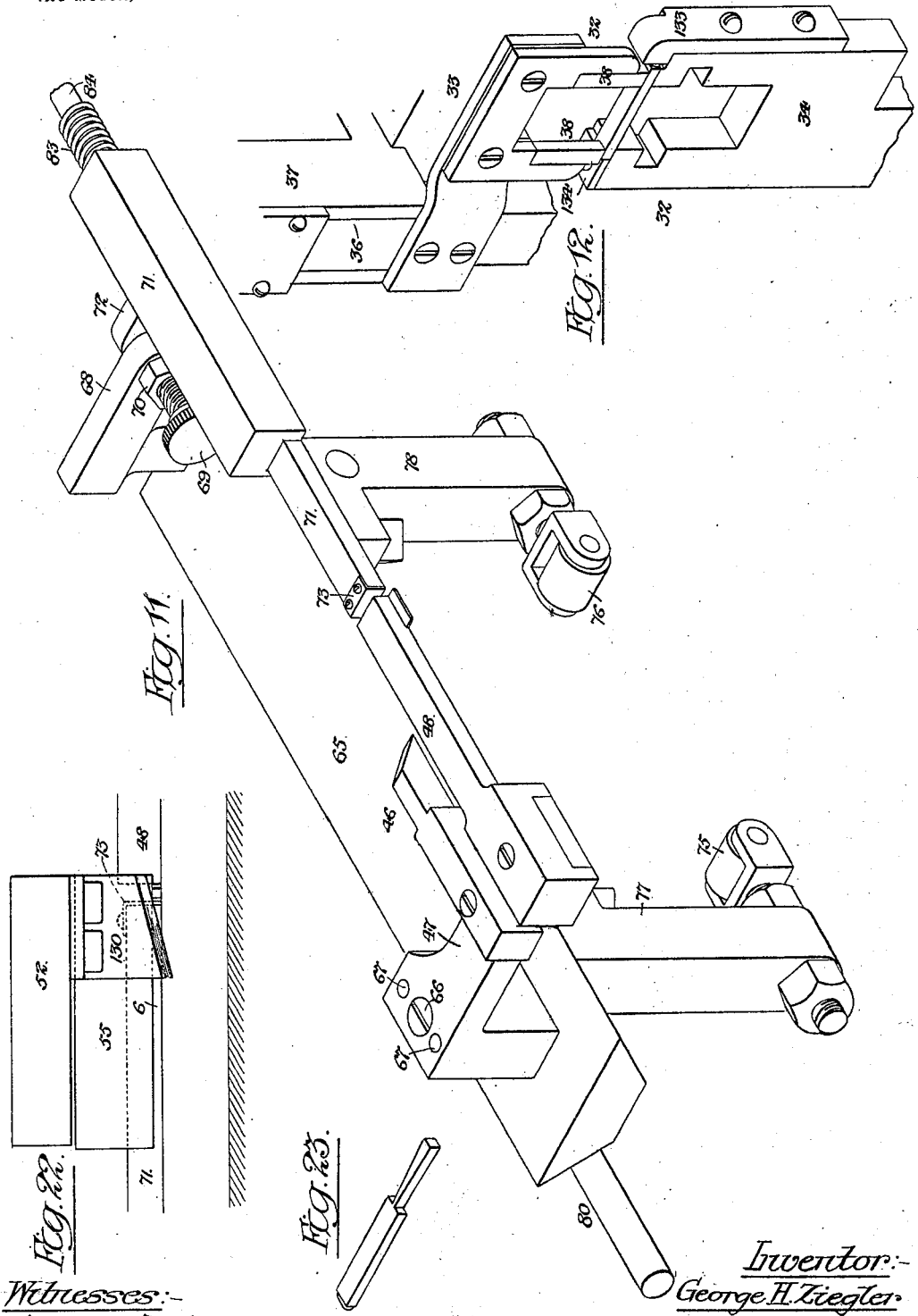

No. 685,083. Patented Oct. 22, 1901.
G. H. ZIEGLER.
TYPE FINISHING MACHINE.
(Application filed June 13, 1901.)
(No Model.) 12 Sheets—Sheet 11.
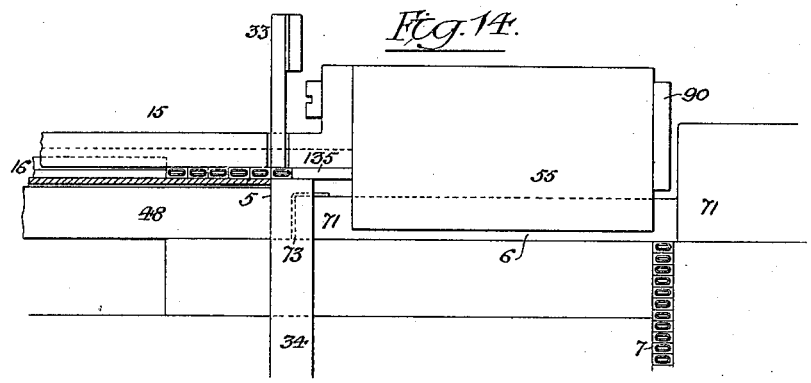
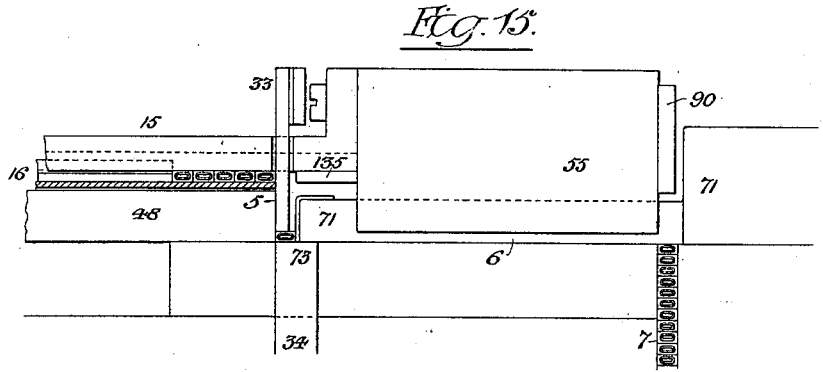
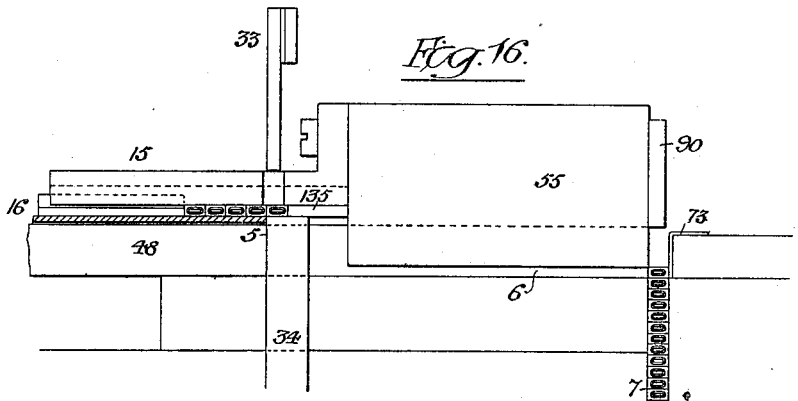
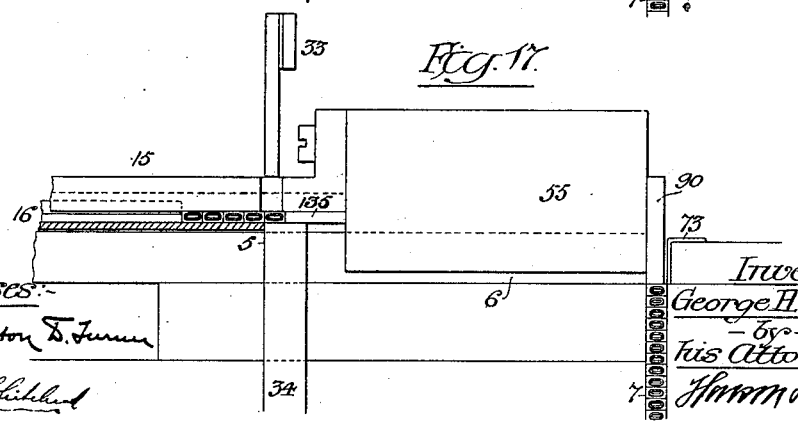

No. 685,083. Patented Oct. 22, 1901.
G. H. ZIEGLER.
TYPE FINISHING MACHINE.
(Application filed June 13, 1901.)
(No Model.) 12 Sheets—Sheet 12.

Witnesses:
H. D. Turner
Louis W. Holickhead

Inventor:
George H. Ziegler
By his Attorneys
Howson & Howson

UNITED STATES PATENT OFFICE.

GEORGE H. ZIEGLER, OF PHILADELPHIA, PENNSYLVANIA, ASSIGNOR TO THE AMERICAN TYPE FOUNDERS' COMPANY, OF NEWARK, NEW JERSEY, A CORPORATION OF NEW JERSEY.

TYPE-FINISHING MACHINE.

SPECIFICATION forming part of Letters Patent No. 685,083, dated October 22, 1901.

Application filed June 13, 1901. Serial No. 64,435. (No model.)

*To all whom it may concern:*

Be it known that I, GEORGE H. ZIEGLER, a citizen of the United States, residing in Philadelphia, Pennsylvania, have invented certain Improvements in Type-Finishing Machines, of which the following is a specification.

This invention relates to certain improvements in machines for finishing type after they have been cast. By this finishing process any fins that may be formed at the base of the letter on the type-body are removed and also the bottom of the type is finished, as fully described hereinafter.

The main object of this invention is to construct a machine which will remove the fins or projections on the corners above described by cutting away the fins rapidly and accurately in place of the hand-rubbing method heretofore employed on this class of type.

A further object of the invention is to provide a machine which will finish the edges of type in which the character overhangs.

By this invention the type after it is cast in any suitable machine and the jets removed from the base thereof is placed upon the table and the operator adjusts a number of type on a stick and places the line of type under the feed-plate of the machine. The mechanism then automatically feeds the type to a vertically-reciprocating carrier, which properly grasps the type and carries it down to a position in line with a horizontal reciprocating carrier, which carries a single type at a time past the first pair of cutters, which trim the two opposite edges of the type. The horizontal reciprocating carrier moves past the cutter until the type held by it is directly above a vertical channel, which is at all times filled with a line of type. A vertically-reciprocating pusher pushes the type from the carrier into the channel, pushing the type in the channel the thickness of one type forward. Projecting at the back of the channel is a cutter which cuts a groove in the base of the type, so as to remove any portion of the jet that may still remain on the body of the type and projecting into the path of the type. In this channel at the character end is a pair of cutters, which trim the two remaining edges not previously cut by the first cutters. The type is then pushed forward, turning in a segmental guide until it is pushed onto a stick, and after a certain length of type is on the stick the said stick is removed and another stick placed in its stead. Thus it will be seen that the machine after the type is fed into it by the operator is entirely automatic. It will trim the upper edges of the type-body below the characters and also trim the base of the type, so as to remove any portion of the jet remaining on the type.

The machine can be used also to trim overhanging type by altering the form of the cutters. This overhanging type cannot be rubbed by the ordinary hand process, and it is a very tedious operation to properly finish the type by hand.

The machine will now be described in detail.

Figure 25:
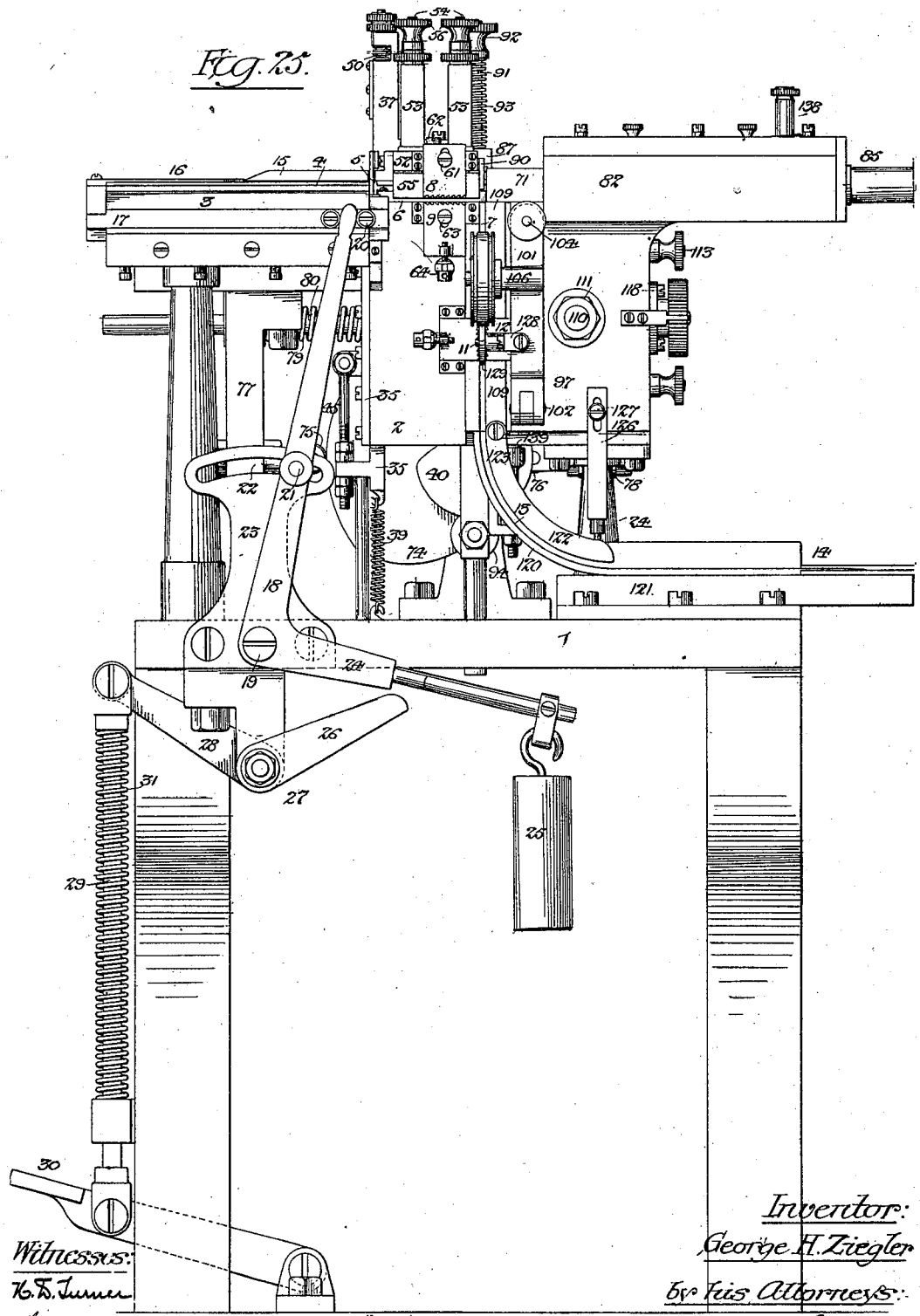

In the accompanying drawings, Figure 1 is a side view of the upper portion of the improved type-finishing machine. Fig. 2 is a plan view. Fig. 3 is an end view. Fig. 4 is an enlarged sectional view on the line $a\,a$, Fig. 1. Fig. 5 is a sectional view on the line $b\,b$, Fig. 1, through the vertical channel. Fig. 6 is a transverse sectional view on the line $c\,c$, Fig. 1. Fig. 7 is a transverse sectional view on the line $d\,d$, Fig. 1. Fig. 8 is a transverse sectional view on the line $e\,e$, Fig. 1. Fig. 9 is a vertical sectional view on the line $f\,f$, Fig. 2. Fig. 10 is a vertical sectional view on the line $g\,g$, Fig. 2. Fig. 11 is a perspective view of the horizontal reciprocating carrier. Fig. 12 is a perspective view of the vertical reciprocating carrier. Fig. 13 is a perspective view of the upper bearing and guide block. Figs. 14, 15, 16, and 17 are diagram views illustrating the operation of the machine. Fig. 18 is a perspective view of one form of cutter. Fig. 18$^a$ is an edge view of a cutter shown in Fig. 18. Fig. 19 is a perspective view of a cutter for finishing overhanging type. Fig. 19$^a$ is a plan view of the cutter shown in connection with an overhanging type. Fig. 20 is a view showing the type in the different stages of the process. Fig. 21 is a perspective view illustrating a type in which the character overhangs. Fig. 22 is a view of a modification, showing a jet-breaker to be used when the type is fed to the machine with the jet attached. Fig. 23 is a perspective view of a type with the jet attached. Fig. 24 is a view showing the method of feeding overhanging type to the machine, and Fig. 25 is a side view of the entire machine.

1 is a stand on which the frame 2 is mounted. This stand may be of any suitable form and in some instances may simply be a long table upon which a number of these machines can be mounted. On each frame is a table 3, on which the type to be finished is placed. The table is of sufficient size to hold a quantity of type, so that the operator can select the type from the table, place them in series in line on a suitable stick, so that they can be placed in position to be fed to the machine. In the frame are four channels. 4 is the first horizontal channel, in which the type are placed by the operator. 5 is the vertical channel, through which the type are carried to the horizontal channel 6, through which the type are carried past two cutters 8 and 9, and 7 is a vertical channel through which the type are traversed past a nick-cutter 10 for cutting a nick in the base and past cutters 11 and 12 for trimming the other two edges of the type. 13 is a segmental channel leading from the channel 7 to the stick 14, onto which the finished type are fed.

The first horizontal channel 4 on the table 3 is formed by an overhanging guide-arm 15, which can be adjusted to the different thickness of type. This guide-arm is of such a length that a number of type can be placed under it by the operator, so that the operator can refill the stick while the machine is feeding the type one by one to the cutters.

The type is placed under the guide-arm 15 against the rib 131, and a pusher 16 feeds the type forward to the vertically-reciprocating carrier. This pusher 16 is connected to a slide 17, adapted to ways in the base of the table 3. The type is forced against the rib 131 by a spring-guide 132, a groove 133 formed in the table to allow for the overhanging portion of some forms of type.

18 is a lever pivoted at 19 to the stand 1. The long arm of this lever passes up between two pins 20 on the slide 17 and is held from vibrating by a pin 21, which travels in the segmental slot 22 in the bracket 23. The short arm 24 of the lever 18 carries an adjustable weight 25 and is acted upon by an arm 26 on a rock-shaft 27, having an arm 28, which is connected by a rod 29 to a treadle 30. A spring 31 on this rod returns the treadle and the arm 26 to its normal position clear of the lever. By this means the operator can place his foot on the treadle, draw the slide 17 and the pusher 16 back, so that the pusher will be clear of the overhanging guide-arm 15, and so that he can place a line of type under the guide-arm in front of the pusher, and by taking his foot off the treadle 30 the pusher is released and it will feed the type into the path of the vertically-reciprocating carrier 32 and against a stop 135, Figs. 10 and 12.

In the vertical channel 5 reciprocates the vertical carrier 32. This carrier is clearly illustrated in Figs. 1, 4, 10, and 12. The carrier consists of two main parts 33 and 34, between which the type is grasped. The part 34 is a U-shaped block, mounted on the slide 35, this latter having its bearings in the frame of the machine, as has also the block, which is formed so as to allow the horizontal carrier to work freely through it. When the block or part 34 is in its raised position, it is even with the top of the table, and the type is fed onto the upper surface of this block 34, between the lugs 133 and 134, by the pusher 16. The lug 133 is preferably made of hard rubber or other suitable material, and both lugs are adjustable. The part 33 is in the form of a gripper and is carried by a slide 36, having its bearings in the standard 37. The gripper part 33 has two arms 38, which grip the type and hold it onto the two projecting fingers of the block 34 as it descends from the position in line with the table to the position in line with the horizontal channel 6. The slide 35 is pulled down by a spring 39 and elevated by a cam 40 on the driving-shaft 41. This cam acts upon the roller 42 on the lever 43, pivoted at 44 to the frame of the machine, and the outer end of this lever is connected to the slide 35 by a rod 45. The rod is screw-threaded, and on the screw-threaded portion of the rod are nuts, which are mounted on each side of the lug projecting from the slide 35, so that the slide and the block 34 of the carrier 32 can be vertically adjusted. The cam 40 is so timed that the block 34 will be lowered when the horizontal gripper is retraced. The slide 36 is raised and lowered by a wedge-shaped bar 46, carried by a slide 47, which carries the plunger 48 of the horizontal carrier. This wedge-shaped bar passes under a roller 49 on the slide 36 and moves the gripper 33 away from the block 34, so that the type can be readily inserted between the gripper and the block. A spring 50 tends to force the gripper toward the block, and after the type has been placed on the block and the wedge 46 withdrawn the gripper will bear upon the type and hold it on the block until it is in position to be carried forward through the channel 6. When the type is removed, the block is raised, lifting the gripper with it until it is even with the top of the table, when the wedge 46 will further raise the gripper so that another type can be fed between the block and the gripper.

51 is a block secured rigidly to the frame of the machine, as clearly shown in Fig. 4, and mounted on this block is an overhanging piece 52, which carries two hollow posts 53, and passing through these posts are spindles 54, attached to an inverted-U-shaped guide-block 55, forming with the frame 2 the horizontal channel 6, through which the type are carried. The distance between the guide-block 55 and the frame 2 is always the same as that between the piece 52 and the block 51, in view of the fact that the said guide-block 55 is constructed to rest upon the frame 2 when the piece 52 is in contact with the block 51. On the end of each spindle 54 are set-nuts 56 for regulating the pressure of the springs 57 within the hollow posts 53, Fig. 10, and these spindles regulate the distance of the guide-block 55 from the piece 52. Projecting from the block 51 is a screw-threaded stud 58 and two posts 59, the same passing through openings in the piece 52, as clearly shown in Figs. 2 and 4, the piece 52 being held to the block by a nut 60 on the screw-stud 58.

In setting the piece 52 and its guide-block for different thicknesses of type a type of the thickness desired is placed, as shown in Fig. 4, between the under side of the piece 52 and the upper surface of the block 51. This raises the piece 52 a corresponding distance and naturally elevates its attached guide-block an equal distance away from the frame 2. The nut 60 is then screwed down, so that the channel 6 for the type will be the same height as the space between the piece 52 and the block 51, which is the proper thickness for the type. The guide-block 55, carried by the piece 52, is not rigidly fixed, but will yield if a type not of the proper thickness should pass into the channel 6, the said block 55 simply acting as a guide for the type and not tending to straighten the same, since they are straight when cast. Adjustably fixed to the piece 52 is a cutter 8, having teeth on its lower edge. This cutter is clearly shown in Fig. 1. The cutter is held in place by a confining-screw 61, which passes through a slot in the cutter and is adjustable vertically by means of a screw 62. Directly under this cutter is a cutter 9, confined to the frame by a screw 63, which passes through a slot in the cutter, and this cutter can also be adjusted vertically by a screw 64, as clearly shown in Fig. 1.

The type as it comes from the casting-machine is shown at $x$, Fig. 20, and as it passes through the channel 6 the letter end thereof will be in line with the cutters and any projections or fins on the upper and lower edges of said end of the body of the type will be removed by said cutters, the type then being in the condition shown at $x'$, Fig. 20.

The type is held rigidly from the time it is placed under the overhanging guide until it passes through the channel 6, and thus the type is prevented from turning in the channel and clogging the machine.

In order to carry the type through the channel 6 from the channel 5 to the channel 7, a slide 65 is provided, mounted in ways in the frame, as clearly shown in Fig. 4, the slide and its gripping-jaws being shown detached from the machine in Fig. 11. Fixed to the slide is a bracket 47, carrying the plunger 48 of the horizontal reciprocating carrier and the wedge 46. The bracket is attached to the slide by a screw 66 and pins 67, Fig. 11. At the opposite end of the slide is a bracket 68, carrying a set-screw 69, on which is a jam-nut 70. This set-screw acts as a stop for the gripping-jaw 71, forming part of the horizontal reciprocating carrier. The jaw has a lug 72, which strikes against the end of the set-screw 69. By this arrangement the distance between the ends of the plunger 48 and the plunger 71 can be regulated for different thicknesses of type. A soft-metal plate 73 is secured to the end of the plunger 71 and tends to hold the type in position without in any way scarring or injuring it. The slide is operated in the present instance by means of a cam 74, Fig. 9, on the shaft 41, the said cam acting against rollers 75 76 on arms 77 78, respectively, depending from the under side of the slide 65. The rollers are adjustable on the arms, so that the movement of the slide can be regulated. A spring 79 is loosely mounted on the rod 80, secured to the arms 78. This rod extends through a fixed lug or bracket 81, Fig. 9, and one end of the spring presses against this bracket, while the other end rests against a nut 136, adjustable on the rod. The spring 79 tends to force the roller 75 against the cam 74. The plunger 71 slides in a casting 82, Figs. 1 and 11, and mounted back of the plunger is a spring 83. In the present instance this spring is mounted on a rod 84, extending through a bearing-cap 85 at the end of the casing 82 and is provided with nuts 86, which can be adjusted on the rod. Between the plunger and the top plate of the casing 82 is an adjustable securing-plate 137. A spring-bolt 138 is provided to retain the plunger 71 in its retracted position when required. As the rod 84 is attached to the plunger 71, the nuts 86 limit the movement of the plunger 71 in one direction, so that the space between the plungers 48 and 71 is directly above the slide-block 34 in the channel 5. The movement of the plunger 71 will be stopped by the nuts 86, while the plunger 48 will be moved farther back to increase the space between the plungers to allow the type to freely pass in between them. On the forward movement of the plunger 48 it will clamp the type between its end and the end of the plunger 71, and the type will be carried in the path of the cutters while being rigidly held by the plungers, and the upper and lower edges of the letters will then be trimmed off by the said cutters. The movement of the plungers carries the type from the channel 5 to a position directly above the vertical channel 7, into which the type is forced by a plunger 87 from between the plungers 48 and 71. As soon as the plunger 87 is retracted the carrier moves back to receive another type.

It will be noticed that when the slide 65 is moved forward by the cam 74, bearing against the roller 76, it causes the plunger 48 to grip the type between it and the plunger 71, the space between the plungers being regulated by the set-screw 69. This set-screw comes in contact with the lug 72 on the plunger 71, and then both plungers 48 and 71 are moved forward, compressing the spring 83. The movement is continued until the arm 68 on the slide 65 strikes a set-screw 88 on a bracket 89, projecting from the frame of the machine. The screw 88 is so set that the slide and its plunger will stop when the type carried by the plungers is directly above the channel 7. As soon as the type is discharged the cam 74 will bear upon the roller 75 and return the slide 65 to its first position, and when the plunger 71 is stopped by the nut 86 on the rod 84 the plunger 48 is moved farther, compressing the spring 79 and increasing the space between the ends of the plungers.

The plunger 87 for forcing the type from between the plungers 48 and 71 into the vertical channel 7 is constructed as follows, (see Figs. 5 and 10:) The plunger 87 is adapted to ways in the frame of the machine and has a bracket 90 attached rigidly to its upper end, and this bracket is directly above the channel 7. Projecting from the upper end of the plunger 87 is a rod 91, on which is a nut 92, and between this nut and the bearing is a spring 93. Mounted on the stud projecting from the lower end of the plunger 87 is a roller 94, which is acted upon by a cam 95. (Clearly shown in Figs. 3 and 5.) The cam is so timed that it will force the plunger 87 down when the type is directly under the bracket 90, and the spring 93 will immediately withdraw the plunger, so as to allow the gripping-plungers 48 and 71 free return movement to grip another type. An adjustable stop 139, carried by the plunger, rests against the frame and limits the upward movement of the plunger. As one type is forced into the channel by the downstroke of the plunger 87 all the other type already in the channel will be moved forward the distance of one type.

In order to nick the base of the type where the jet is broken off, a cutter 10 is provided, Figs. 5 and 8, which projects into the channel 7 a sufficient distance to cut a nick in the base of the type at $x^2$, as shown in Fig. 20. The cutter is secured to a carrier 96, which is attached to a bearing 97 by screws 98 and can be adjusted by a set-screw 99.

In front of the channel 7, opposite the cutter 10, is a pusher-roller 100, which is adapted to bearings in the arm 101, pivoted at 102 to a projection on the machine. A spring 103 on the rod 104 tends to force the roller against the letter end of the type. This roller is preferably made of material which while not defacing the type will prevent it moving away from the cutter as it passes through the channel, thereby retaining the type in proper position to be acted upon by the cutters 11 and 12. The roller 100 is preferably grooved, having one or more grooves 105. The roller is shown in the present instance as having two grooves 105, with a flat surface between them. The roller can be set on its stud by using one or more washers 106, so as to bring one or other of the grooves in line with the channel 7. The object of providing the roller with grooves is to allow the flat portion of the roller to rest against the body of the type when such small characters as periods, commas, quotations, and hyphens are being finished, as the character is so small that the type would be injured if the roller should press directly against the face of the type.

When heavy-faced type are being finished, a plain roller may be substituted for the grooved roller without departing from the invention.

On the sides of the channel are the cutters 11 and 12, Figs. 1 and 18. These cutters are directly below the cutter 10 and are for the purpose of cutting the two remaining edges of the body of the type at the latter end, as shown at $x^2$, Fig. 20. When these edges are cut, the type is finished, as shown at $x^3$, Fig. 20.

The cutters 11 and 12 are adapted to suitable bearings and can be adjusted toward or from each other by screws 107 and 108. The plate on one side of the channel 7 is rigid, while the plate 109 on the opposite side of the channel is yielding, being mounted in the bearing 97, secured to the frame of the machine by a bolt and nut 110 111, Fig. 6. Extending from the plate 109 are rods 112, having nuts 113 at their ends, and mounted on the rods are springs 114, Fig. 7, which tend to force the plate 109 forward, the nuts 113 limiting the forward movement of the plate. In the event of the type being twisted or accidentally misplaced in the channel 7 the plate 109 will readily yield, so as to allow the type to pass through without breaking the machine.

The bearing 97 can be adjusted so as to increase or diminish the width of the channel 7 by means of a nut 115, which is adapted to a threaded stud 116, projecting from a block 117 on the bolt 110. The nut 115 is held to the bearing by means of a plate 118, which is secured to the bearing, and on the bearing is a spring-retainer 119, which engages with any one of a series of notches on the periphery of the nut 115, so that the nut will be prevented from turning after being adjusted in position.

Carried by the arm 101 is an adjustable bracket 128, on which is a small roller 129. This roller is directly under the big roller 100 and is in line with the type as it is being trimmed by the cutters 11 and 12 and is for the purpose of holding the type in position while the cutters are acting. This roller is not absolutely essential in some classes of type, but its use is preferred.

After the type leaves the cutters 11 and 12 it passes down through the channel 7 into the segmental channel 13 and is guided through said chanel onto the horizontal or stick portion 14, where it is pushed forward onto the removable stick, and after a certain number of type are fed onto the stick the stick is removed and another stick placed in its stead.

The portion 120 of the segment is fixed, being secured rigidly to the base-block 121, while the portion 122 is pivoted at 123 to the movable plate 109, so that when the said plate or the bearing 97 is adjusted for different-size type the section 122 of the segment is also adjusted. The free end of the portion 122 of the segment is held in place by a plunger 124, back of which is a spring 125, and this plunger is carried by a plate 126, adjustable on the bearing 97, a confining-screw 127 passing through a slot in the plate and into a threaded opening in the bearing, so that in the case of any jamming of the type in turning the curve the segment 122 will yield to a certain extent.

When the bearing 97 and the plate 109 are adjusted to increase or diminish the width of the channel 7, the width of the channel 13 is also increased or diminished.

The form of cutter which is preferred for trimming ordinary type is shown clearly in Figs. 18 and 18$^a$, in which the cutting-face of the cutter consists of a series of teeth. It will be noticed that the cutting-faces of these teeth are set one in advance of the other, so that a series of very fine cuts are made rather than making one heavy cut.

In Figs. 19 and 19$^a$ is shown a cutter used for finishing overhanging type, Fig. 19$^a$ showing the cutter in position to finish the overhanging portion of the type. This cutter may be used to cut the type as it travels in either the horizontal or vertical channel.

Fig. 24 is a view showing the construction of the mechanism at the table when type with overhanging characters are fed to the machine. The face of the plunger 16 is slightly beveled in one direction and the face of the stop 135 is slightly beveled in the opposite direction, so as to accommodate the irregular type. As soon as the plungers 48 and 71 grip the type it will be straightened and presented properly to the cutters.

In some instances the overhanging guide-arm 15 and the pusher 16, with the foot-lever, may be dispensed with and the type fed to the first carrier by hand, suitable guides being provided on the table against which the type is fed. The feed mechanism shown, however, is preferred.

When the type is fed to the machine with the jets attached, as shown in Fig. 23, then the jet-breaker 130 is used, as clearly shown in Fig. 22, this jet-breaker being at the mouth of the channel 6, so that as soon as a type enters this channel and is held by the plungers 48 and 71 it will pass the jet-breaker 130, which will break the overhanging jet from the type-body. It has been found in practice, however, that the jets can be readily removed from the body of the type before the type is fed to the finishing-machine, so that a jet-breaker is dispensed with in most instances.

Thus it will be seen that type can be rapidly and accurately finished on a machine of the above-described construction.

A number of the type are placed on the table of the machine in the condition shown at $x$, Fig. 20, the operator places a number of the type on the usual composing-stick and places his foot on the treadle, which withdraws the plunger 16, and the operator slips the type from the stick in the channel under the guide-arm 15, then releases the treadle, and consequently the plunger 16 bears upon the line of type, forcing it into the path of the vertically-reciprocating carrier 32, as in Fig. 14, which carries the type down the channel 5 to a position in line with the channel 6, Fig. 15, at which point the plungers 48 and 71 of the horizontal reciprocating carrier grip the type and carry it forward through the channel 6 between the cutters 8 and 9, which trim the two edges of the type, as shown at $x'$, Fig. 20, and carry the type to a point directly above the vertical channel 7, as shown in Fig. 16. The plungers then release the type sufficiently to allow the vertical plunger 87 to force the type from between the plungers 48 and 71 down into the channel 7, as shown in the diagram, Fig. 17.

By forcing the type into the channel the type already in the channel 7 are moved forward the distance of the thickness of one type, the cutter 10 nicking the type, as shown at $x^2$, Fig. 20, while other cutters 11 and 12 finish the remaining edges of the type, as shown at $x^3$, Fig. 20, the type then passing through the segmental channel onto the stick in the finished condition.

I claim as my invention—

1. The combination in a machine for finishing type, of the frame having two channels, one at right angles to the other, a table, carriers for carrying the type through the first channel to a position above the second channel, a plunger for forcing the type from the carrier into the second channel, means for carrying the type from the table to the carrier, and cutters acting upon the type, substantially as described.

2. The combination in a type-finishing machine, of the table, a frame having channels at right angles to each other, the horizontal channel being below the table, a vertically-movable carrier adapted to receive the type from the table and carry it to the position in line with the horizontal carrier, a horizontal movable carrier adapted to receive the type from the vertically-movable carrier and carry it through the horizontal channel, and cutters acting upon the type, substantially as described.

3. The combination of the table, a U-shaped block onto which the type is fed from the table, a gripper for confining the type to the U-shaped block, means for lowering the U-shaped block, a channel and grippers and plungers between the ends of which the type is fed, means for drawing the plungers together so as to grip the type, means for feeding the plungers forward to the channel, and cutters acting upon the type, substantially as described.

4. The combination in a type-finishing machine, of a table having channels at right angles to each other, means for carrying the type from the table to a position in line with the first channel, a slide, a plunger carried by said slide, a plunger controlled by the slide so that the type will be grasped between the plungers and carried through the channel, cutters for partly trimming the type as it passes through the channel, a plunger for forcing the type from the carrier into the other channel, and cutters for completing the trimming of the type, substantially as described.

5. The combination in a type-finishing machine, of a frame, two channels formed therein at right angles to each other, a table mounted above the channels, a guide on said table, a plate against which the type is fed, and a block upon which the type is fed, a gripper for gripping the type to the block, means for operating the block so as to carry the type to a point in line with the first channel, carriers for carrying the type through the first channel, a plunger for forcing the type from the carriers into the second channel, and cutters for trimming the type, substantially as described.

6. The combination in a type-finishing machine having means for trimming the four edges of the type, of a carrier for carrying the type past the first cutters, and a pusher for forcing the type past the second cutters, a table, a typeway on the table, a pusher on the table for forcing the type through the typeway, and means for transferring the type from the typeway to the carrier, substantially as described.

7. The combination in a type-finishing machine having two channels one at right angles to the other, cutters adjacent to each channel, means for feeding the type through the channels, a table, a typeway on the table, a pusher for feeding the type forward on the table, means for transferring the type from the typeway to the carrier, and a weighted lever actuating the pusher, substantially as described.

8. The combination in a type-finishing machine having two channels one at right angles to the other, cutters adjacent to each channel, means for feeding the type through the channels, a table, a typeway on the table, a pusher for feeding the type forward on the table, means for transferring the type from the typeway to the carrier, a weighted lever actuating the pusher, and means for actuating the weighted lever and slide so as to return the slide, substantially as described.

9. The combination in a type-finishing machine having two channels, one at right angles to the other, a type-carrier in the first channel for carrying the type therethrough, a pusher above the second channel for transferring the type from the first channel into the second channel, cutters for trimming the corners of the type adjacent to the two channels, a table, and a vertical reciprocating transfer device for transferring the type from the table to the first channel, and means for feeding the type to the transfer device, substantially as described.

10. The combination in a type-finishing machine having two channels, one at right angles to the other, cutters adjacent to each channel, means for carrying the type through the first channel, and means for pushing the type through the second channel, a grooved roller for bearing against the type as it is being finished in the second channel, substantially as described.

11. The combination in a type-finishing machine having two channels, one at right angles to the other, means for feeding the type through the first channel, and means for pushing the type through the second channel, cutters for cutting the type and for trimming the two corners of the type, arranged in position in respect to the second channel, two rollers, one mounted below the other, one roller being opposite the cutter for trimming the base of the type, the other roller being in line with the cutter for trimming the corners of the type, substantially as described.

12. The combination in a type-finishing machine having two channels one at right angles to the other, means for feeding the type to the channels, cutters arranged in respect to the channels for trimming the type, a segmental guide for transferring the type from the vertical channel to the horizontal stick after they have been finished, one side of the vertical channel being adjustable to fit different sizes of type, a segment pivoted to the adjustable side and in line with the fixed segment, and a yielding pressure device bearing upon the lower portion of the segment, substantially as and for the purpose set forth.

13. The combination in a type-finishing machine having channels one at right angles to the other, means for feeding the type through the channels, one channel being horizontal and the other vertical, a cutter at the rear of the vertical channel for cutting the base of the type, cutters arranged at each side of the channel for cutting two upper edges of the type, a pivoted arm, a spring back of said arm, a roller carried by the said arm in line with the cutter for the base of the type, and an adjustable bearing on the arm, and a roller carried by said bearing and in line with the side cutters, substantially as described.

14. The combination in a type-finishing machine having a horizontal channel and a vertical channel through which the type is carried, a carrier mounted in the horizontal channel, a slide to which one portion of the carrier is attached, a cam actuating the slide, a spring, a second slide forming the other portion of the carrier, a spring back of said second slide, an arm on the first slide engaging a stop on the second slide, and a stop on the frame for limiting the movement of the first slide, the whole arranged and combined, substantially as described.

15. The combination in a type-finishing machine, of a vertical channel, a carrier mounted therein consisting of a block and clamp for clamping the block and carrying it through the channel, a horizontal channel communicating with the vertical channel, a carrier arranged to reciprocate in said horizontal channel consisting of two plungers, means for causing the two plungers to clamp the type while held by the vertically-reciprocating carrier, means for trimming two sides of the type as it is carried through the horizontal channel, a vertical channel communicating with the horizontal channel, means for pushing the type from between the plungers of the horizontal carrier into the vertical channel and causing the type in said vertical channel to move forward, and cutters mounted so as to trim the two remaining edges of the type as they pass through the channel, substantially as described.

16. The combination in a type-finishing machine, of a horizontal channel, means for feeding type to said channel, a vertical channel communicating with said horizontal channel, a slide 65 mounted in the frame, a plunger 48 carried by said slide, a box, a plunger 71 mounted in the box, a spring back of the plunger, an arm on the slide 65 engaging the said plunger during a certain portion of the stroke of the slide, whereby the plungers 48 and 71 are separated to allow the type to pass into the space between the plungers after which the type is gripped by the plungers and carried through the horizontal channel and again released when in line with the vertical channel, with means for trimming the type as it passes through the horizontal channel, substantially as described.

17. The combination in a type-finishing machine, of a horizontal channel, a vertical channel, means for carrying the type through the horizontal channel into line with the vertical channel, means for forcing the type one at a time into the vertical channel, a cutter for trimming the base of the type while in the vertical channel, a roller bearing against the face of the type, while the base is being cut, substantially as described.

18. The combination in a type-finishing machine, of a horizontal channel, a vertical channel, means for carrying the type through the horizontal channel into line with the vertical channel, means for forcing the type one at a time into the vertical channel, a cutter for trimming the base of the type while in the vertical channel, a roller bearing against the face of the type while the base is being cut, said roller having one or more annular grooves therein to receive the character, so that the roller will bear upon the shoulders of the type, substantially as described.

19. The combination in a type-finishing machine, of a horizontal channel, means for carrying the type through said channel, a vertical channel communicating with the horizontal channel, means for forcing the type from the horizontal channel into the vertical channel one type at a time, cutters mounted on each side of the channel for trimming the edges of the type as they pass through the vertical channel, and a roller pressing against the type while being cut, substantially as described.

20. The combination in a type-finishing machine, of a vertical channel through which the type is fed, means for feeding the type into said channel, a cutter extending into the channel for cutting a groove in the base of the type, cutters mounted on each side of the channel for cutting the two edges of the type, an arm pivoted to the frame of the machine, a spring bearing against said arm, two rollers carried by said arm, one roller being in line with the cutter for grooving the base of the type, the other roller being in line with the cutters for trimming the edges of the type, substantially as described.

21. The combination in a machine for finishing type, of a frame having a vertical channel and a horizontal channel, a vertically-reciprocating carrier in the vertical channel, a horizontally-reciprocating carrier in the horizontal channel, the first-mentioned carrier consisting of a block and a gripper, the other carrier consisting of two plungers between which the type is held, the block of the first-mentioned carrier being open to allow for the passage of one of the plungers in the transfer of the type from the vertically-reciprocating carrier to the horizontally-reciprocating carrier, substantially as described.

22. The combination in a type-finishing machine, of a channel, cutters arranged in position in respect to the channel, two plungers between which the type to be finished is held, one of said plungers having a soft-metal face, substantially as and for the purpose set forth.

23. The combination in a type-finishing machine, of cutters for trimming the type, means for feeding the type past the cutters, a channel in which the type is placed by the operator, said channel being formed by an overhanging arm, a rib on one side of the channel, a spring on the opposite side tending to force the type against the rib as they are fed to the carrying mechanism, substantially as described.

24. The combination in a type-finishing machine, of channels through which the type is fed, cutters for finishing the type, means for carrying the type in the channels past the cutters, a channel in which the type is placed by the operator, a pusher for pushing the type forward, a stop to limit the forward movement of the type, with a vertically-reciprocating carrier, said stop being in line so that the type will be forced in between the block and the gripper of the vertically-reciprocating carrier, substantially as described.

25. A cutter for a type-finishing machine having a series of teeth, the face of the teeth being beveled so as to clear the overhanging portion of the type, substantially as described.

26. The combination in a type-finishing machine, of cutters, means for feeding the type to the cutters, a guideway, a beveled stop, and a beveled pusher whereby type with overhanging characters can be fed to the machine, substantially as described.

27. The combination in a type-finishing machine, of cutters, means for feeding the type past the cutters, a table, a channel at the table, a vertically-reciprocating carrier, said carrier consisting of a block and a gripper between which the block is held, said block having two flanges one on each end to prevent lateral movement of the type while in the carrier, substantially as described.

In testimony whereof I have signed my name to this specification in the presence of two subscribing witnesses.

GEO. H. ZIEGLER.

Witnesses:
WILL. A. BARR,
JOS. H. KLEIN.